(12) United States Patent
Garbuio et al.

(10) Patent No.: US 11,728,652 B2
(45) Date of Patent: Aug. 15, 2023

(54) REGULATION PROCESS OF AN ELECTRICAL DISTRIBUTION NETWORK

(71) Applicants: Schneider Electric Industries SAS, Rueil Malmaison (FR); Institut Polytechnique de Grenoble, Rueil Malmaison (FR)

(72) Inventors: Lauric Garbuio, Saint Martin le Vinoux (FR); Kevin Marojahan Banjar Nahor, Grenoble (FR); Vincent Debusscherer, Grenoble (FR); Thi-Thu-Ha Pham, La Tronche (FR); Nouredine Hadjsaid, Grenoble (FR)

(73) Assignees: Schneider Electric Industries SAS, Rueil Malmaison (FR); Institut Polytechnique de Grenoble, Grenoble (FR)

( * ) Notice: Subject to any disclaimer, the term of this patent is extended or adjusted under 35 U.S.C. 154(b) by 47 days.

(21) Appl. No.: 16/719,115

(22) Filed: Dec. 18, 2019

(65) Prior Publication Data

US 2020/0203955 A1    Jun. 25, 2020

(30) Foreign Application Priority Data

Dec. 20, 2018   (FR) ........................... 1873570

(51) Int. Cl.
  *H02J 3/32*   (2006.01)
  *H02J 3/38*   (2006.01)
(52) U.S. Cl.
  CPC ............. *H02J 3/381* (2013.01); *H02J 3/32* (2013.01); *H02J 2300/24* (2020.01); *H02J 2300/28* (2020.01)

(58) Field of Classification Search
  CPC .......... H02J 3/381; H02J 3/32; H02J 2300/28; H02J 2300/24; H02J 3/241; H02J 3/48;
  (Continued)

(56) References Cited

U.S. PATENT DOCUMENTS

2010/0138070 A1\*  6/2010  Beaudoin ............... H02J 3/381
                                                 700/297
2014/0111377 A1\*  4/2014  Achanta ............... G01S 19/215
                                                 342/357.58

(Continued)

FOREIGN PATENT DOCUMENTS

EP          2600479 A1 \*  6/2013   ............... H02J 3/38

OTHER PUBLICATIONS

J. C. Vasquez, J. M. Guerrero, J. Miret, M. Castilla and L. G. de Vicuña, "Hierarchical Control of Intelligent Microgrids," in IEEE Industrial Electronics Magazine, vol. 4, No. 4, pp. 23-29, Dec. 2010, doi: 10.1109/MIE.2010.938720. (Year: 2010).\*

*Primary Examiner* — Elim Ortiz
(74) *Attorney, Agent, or Firm* — Locke Lord LLP (57) ABSTRACT

A regulation process of an electrical distribution network that comprises a main power source, among one or more electrical sources, configured to impose on the network the voltage and frequency of a power circulating on the network to which one or more loads are connected.
The process includes, in the event of a variation of one of the frequency or the voltage detected on the network, during a primary regulation, one adjustment step by the main source of the other between the frequency and the voltage, to maintain constant the ratio voltage/frequency.

16 Claims, 7 Drawing Sheets

(58) Field of Classification Search
CPC ....... H02J 3/28; H02J 3/46; H02J 3/24; Y02E 10/56
USPC ...... 307/2, 3, 4, 5, 6, 11, 16, 18, 19, 23, 25, 307/29, 43, 57, 58, 78, 83
See application file for complete search history.

(56) References Cited

U.S. PATENT DOCUMENTS

| | | | |
|---|---|---|---|
| 2014/0218985 A1* | 8/2014 | Yu ........................ | H02M 7/537 363/97 |
| 2015/0042092 A1* | 2/2015 | Nelson .................... | H02M 1/12 290/44 |
| 2015/0162750 A1* | 6/2015 | Varma ....................... | H02J 3/24 307/52 |
| 2016/0156190 A1* | 6/2016 | Wells ...................... | H02J 3/381 307/18 |
| 2017/0005515 A1* | 1/2017 | Sanders .................. | H02J 3/322 |
| 2019/0140453 A1* | 5/2019 | Yi ............................ | H02J 3/38 |

\* cited by examiner

REGULATION PROCESS OF AN ELECTRICAL DISTRIBUTION NETWORK

TECHNICAL FIELD

The present invention relates to a regulation process of an electrical distribution network. In particular, the present invention proposes a regulation process of an electrical distribution network that is independent of the primary reserve at the disposal thereof.

Notably, the present invention proposes a regulation process for stabilizing the network regardless of the primary reserve state.

The process is particularly suitable for the regulation of a micro-network, notably a micro-network having a high renewable energy penetration rate.

PRIOR ART

The stability of electrical distribution networks is a constant concern for the operators of said networks. The latter are then traditionally designed to respond to a criterion called "N-1 criterion" which allows them to withstand the occurrence of a fault without major impact on the stability of the network and thus prevent a general blackout scenario.

To meet the N-1 criterion, interconnected networks share the electrical energy production sources thereof and propose operating schemes that make it possible to react appropriately when a fault occurs on the network.

According to these schemes, it is then envisaged to cut off some loads, to start other energy sources such as generating sets, or virtual synchronous generators.

In this respect, respecting the N-1 criterion comprises the dimensioning of a primary reserve of energy ("spinning reserve") that is sufficient to respond to a given event and in an immediate manner as part of a primary regulation.

This primary regulation notably involves an adjustment, via droop, of the frequency or the voltage of the electrical distribution network in order to respond to a load demand or compensate for a fault occurring on the electrical distribution network.

A so-called secondary regulation can then take place later in order to reset the electrical distribution network into the initial state thereof.

The primary reserve is relatively flexible once it is used by forecast and stable energy production sources like generating sets.

However, once the primary reserve is insufficient to respond either to a load demand or to a fault on the network, a droop regulation will inevitably lead to a blackout.

Moreover, the dimensioning of a primary reserve becomes complicated once the electrical energy production sources involve intermittent sources such as renewable energy sources.

This complication is all the greater since the electrical distribution network is a micro-network operating autonomously.

Furthermore, the intermittent sources generally only exhibit low inertia, and react in a dispersed and uncoordinated manner when a fault or load demand occurs thus worsening the instability of the network. Such behaviour of the intermittent sources does not allow the network to be stabilized.

Finally, droop regulation can generate flow variations and thus cause damage to all equipment operating the network.

It has been possible to propose giving the intermittent sources a synchronous generator nature, called virtual synchronous generator.

However, since there is no standard governing the operation of virtual synchronous generators allowing the latter to stabilize a network, this solution is not always satisfactory.

One aim of the present invention is to propose a process of controlling a generator making it possible to guarantee the stability of the electrical distribution network.

Another aim of the present invention is to propose a process of controlling a generator making it possible to increase the penetration rate of the renewable energy sources.

Another aim of the present invention is to propose a process of controlling a generator making it possible to guarantee the stability of the network also when the primary reserve is insufficient.

Finally, another aim of the present invention is to propose a process of controlling a generator offering protection against damage to the various pieces of equipment, notably electrosensitive equipment, operating the network.

DISCLOSURE OF THE INVENTION

The aims of the present invention are, at least partly, achieved by a regulation process of an electrical distribution network that comprises a main power source, among one or more electrical sources, configured to impose on the network the voltage V and frequency f of a power P circulating on the network to which one or more loads are connected.

The process includes, in the event of a variation of one of the frequency $f$ or the voltage V detected on the network, during a primary regulation, one adjustment step by the main source of the other between the frequency $f$ and the voltage V, to maintain substantially constant the ratio V/F.

"Substantially constant" means a ratio that can vary by more or less 5% around a setpoint value.

Thus, according to the present invention, in response to a load demand or to the appearance of a fault on the network, maintaining the ratio V/f makes it possible to stabilize the network without considering the primary reserve.

Moreover, since this regulation is independent of the primary reserve, a greater contribution of the renewable energies can be considered, for example 100%.

Furthermore, a ratio V/f kept substantially constant makes it possible to maintain a constant flow in the loads, notably electrosensitive equipment, and thus prevent wear to or overheating of a motor of a load.

Finally, the process according to the present invention can be implemented on a pre-existing electrical distribution network.

According to one mode of implementation, the main source comprises a regulator for executing the adjustment step.

According to one mode of implementation, the regulator measures the frequency f and the voltage V of the distribution network, advantageously, the measurement is carried out at regular time intervals.

According to one mode of implementation, the main source is intermittent.

According to one mode of implementation, the main source may not impose power, and comprise, for example, a motor, the shaft of which is not connected.

The main source can comprise an energy storage system, for example a flywheel, a battery, etc.

According to one mode of implementation, the main source is a renewable energy source, and in particular the renewable energy source comprises at least one source chosen from: a solar energy source, a wind energy source, an energy source.

According to one mode of implementation, the main source comprises an inverter supplied with a control law giving it a synchronous generator behaviour such that the main source forms a virtual synchronous generator.

According to one mode of implementation, the at least one source also comprises other sources, advantageously intermittent sources, even more advantageously renewable energy sources.

According to one mode of implementation, the primary regulation is followed by a secondary regulation allowing the frequency f and the voltage V of the network to be restored to predetermined values.

The invention also relates to a computer program, comprising instructions which, when the computer program is executed by a computer, result in implementing the regulation process according to the invention.

The invention also relates to a power source configured to impose on the network the voltage V and frequency f of a power P circulating on said network, and provided with the computer program according to the present invention.

BRIEF DESCRIPTION OF THE DRAWINGS

Other features and advantages will emerge from the following description of modes of implementation of the regulation process of an electrical distribution network according to the invention, which are given as nonlimiting examples, with reference to the appended drawings wherein.

DETAILED DISCLOSURE OF SPECIFIC EMBODIMENTS

The present invention described in detail hereafter implements a regulation process of an electrical distribution network provided with a source, called a main source, among one or more energy sources, configured to impose on the network the voltage V and the frequency f of a power P circulating on the network and intended to be consumed by loads.

In particular, the main source is suitable for keeping constant the ratio of the voltage V and of the frequency f of the power P circulating on the network.

"Power source" means any source that can optionally deliver an electric current, impose a voltage.

By way of example, a power source can comprise, in a nonlimiting manner, a synchronous generator, an asynchronous generator, a voltage source.

The present invention, although described in the context of electrical distribution networks generally, can advantageously be implemented within a micro-network.

"Micro-network" ("micro-grid") means a local electrical network intended to produce and distribute electrical energy in isolated regions far from the large electrical energy production centres. The isolated regions are, for example, islands, mountainous regions, or desert areas. The micro-network principle also applies when a building, district, campus, or other entity connected to an extensive distribution network intends on managing the energy production thereof differently and increase the resilience capability thereof.

The main interest of micro-networks is that they operate autonomously (in islanded mode, without connection to the public network), and are located in proximity to the consumption areas (the loads). Thus, the losses inherent in the long-distance distribution networks are limited.

Moreover, according to the present invention, an "electrical distribution network" can comprise an electrical distribution network or a power transmission network or an electrical sub-transmission network.

The invention is now described in detail with reference to FIGS. 1, 2, 3a to 3d, 4a to 4d, and 5a to 5d.

Figure 1:
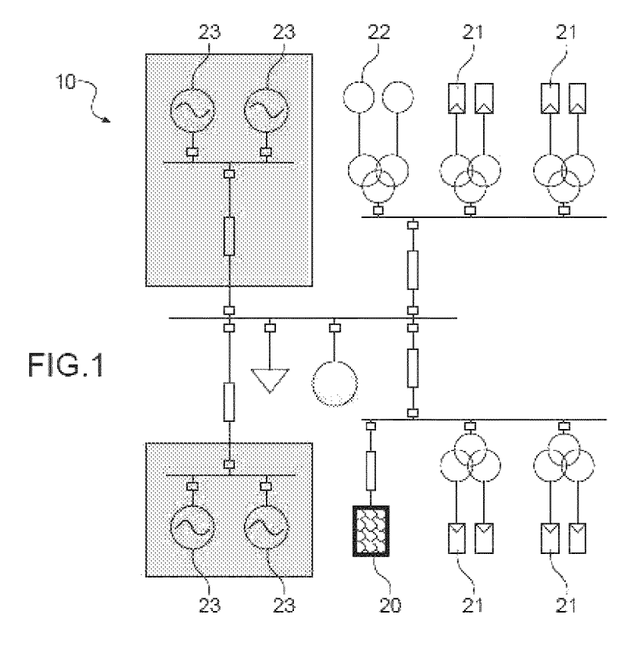
FIG. 1 is a schematic representation of an electrical distribution network on which the present invention can be implemented.

FIG. 1 represents an electrical distribution network 10.

The electrical distribution network comprises one or more power sources.

Among one or more power sources is a source called a main source 20 which is configured to impose on the network the voltage V and the frequency f of a power P circulating (or distributed) on the electrical distribution network 10.

In other words, the main source 20 can form the network.

The main source 20 can comprise a synchronous generator, notably a generating set.

Alternatively, the main source 20 can comprise an intermittent energy source. More particularly, the intermittent energy source can comprise a renewable energy source, and for example comprise photovoltaic panels, wind turbines, marine turbines, thermodynamic machines.

The intermittent energy source can be provided with an inverter supplied with a control law giving the intermittent energy source a synchronous generator behaviour such that the main source forms a virtual synchronous generator.

One or more sources can also comprise other sources, advantageously intermittent sources 21, even more advantageously renewable energy sources. For example, the renewable energy sources can comprise photovoltaic panels, wind turbines, marine turbines, thermodynamic machines.

Additionally or alternatively, the at least one source can comprise one or more batteries 22.

Still additionally or alternatively, one or more sources can comprise one or more generators 23, for example synchronous generators, asynchronous generators, or a combination of the two.

The process according to the present invention comprises an adjustment step, as part of a primary regulation, which keeps the ratio of the voltage V to the frequency f substantially constant.

In particular, once the frequency f of the electrical power P circulating on the network varies, the adjustment step comprises an adjustment of the voltage V such as to keep the ratio of the voltage V to the frequency f substantially constant.

In an equivalent manner, once the voltage V of the electrical power P circulating on the network varies, the adjustment step comprises an adjustment of the frequency f such as to keep the ratio of the voltage V to the frequency f substantially constant.

Such variations in frequency and/or voltage of the power P circulating on the electrical distribution network can occur during load demands or during the appearance of a fault.

This regulation is implemented by the main source which can form the network.

In this respect, the main source 20 can comprise a regulator R configured to provide the regulation according to the terms of the invention.

In particular, the regulator can measure the frequency f and the voltage V of the electrical power P.

In a particularly advantageous manner, the measurement is carried out at regular time intervals, for example every second.

This measurement makes it possible to establish the state of the network and also to detect the occurrence of an event like a load demand or the appearance of a fault.

Figure 2:
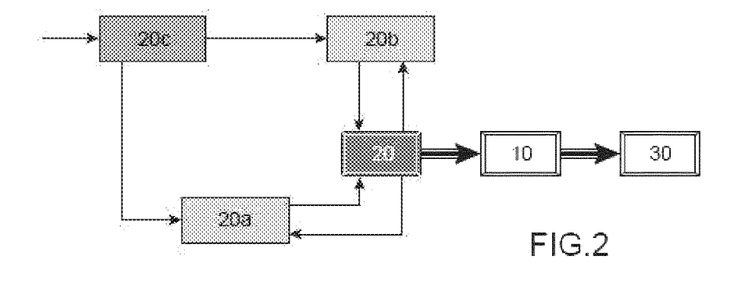
FIG. 2 is a representation in functional modules of a primary source and of a regulator that can be implemented within the context of the present invention.

FIG. 2 is a schematic representation of the implementation of the regulation according to the present invention.

In particular, FIG. 2 represents a main source 20 connected to an electrical distribution network 10 distributing a power P to a load 30.

The main source 20 is linked to a regulator provided with submodules, and notably a module for regulating the frequency 20a, a module for regulating the voltage 20b and a control module 20c for the module for regulating the frequency 20a and for the module for regulating the voltage 20b.

The module for regulating the frequency 20a requires the main source 20 to adjust the frequency of a power circulating on the network to a given frequency.

The module for regulating the voltage 20b requires the main source 20 to adjust the voltage of a power circulating on the network to a given voltage.

The control module 20c indicates to the frequency module 20a and to the voltage regulating module 20b the frequency f and the voltage V, respectively, that the primary source must impose on the network.

Advantageously, the voltage V and the frequency f of the power P circulating on the network are measured by the control module 20c.

This proposed regulation makes it possible to retain a balance between consumed power and produced power at any time independently of the state of an optional primary reserve.

The regulation can also incorporate a droop modulation of the frequency and/or of the voltage if a sufficient primary reserve is immediately available in order to respond to a given event.

The regulation proposed according to the present invention is also advantageous insofar as it does not require communication between the various pieces of equipment, and notably the energy sources, connected to the network.

The primary regulation can be followed by a secondary regulation making it possible to restore the frequency f and the voltage V of the network to predetermined values.

The invention also relates to a computer program, comprising instructions which, when the computer program is executed by a computer, result in implementing the process according to the present invention.

The invention also relates to an energy source configured to impose on a network the voltage V and the frequency f of a power P circulating on said network, and provided with the computer program according to the present invention.

The process according to the present invention has been subjected to various simulations.

According to a first example, the inventors simulated the behaviour of a combination of a network-forming generator (or "grid former") and of a synchronous generator.

In this respect, FIGS. 3a to 3d represent the results relating to the numerical simulation of the regulation of a network following a drop in the active power on said network at a time $t=t_0$.

Figure 3A:
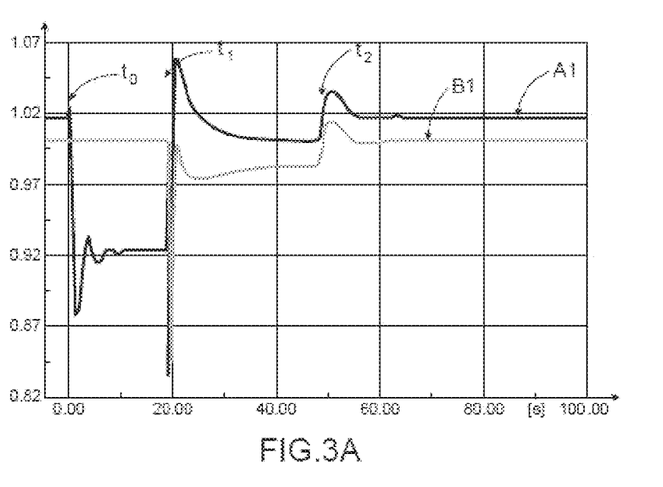
FIG. 3A represents the voltage delivered (vertical axis) as a function of time (horizontal axis) by the network-forming generator (curve A1) and by the synchronous generator (curve B1) as part of a first simulation of the present invention.

In particular, FIG. 3a represents the voltage delivered (vertical axis) as a function of time (horizontal axis) by the network-forming generator (curve A1) and by the synchronous generator (curve B1).

Figure 3B:
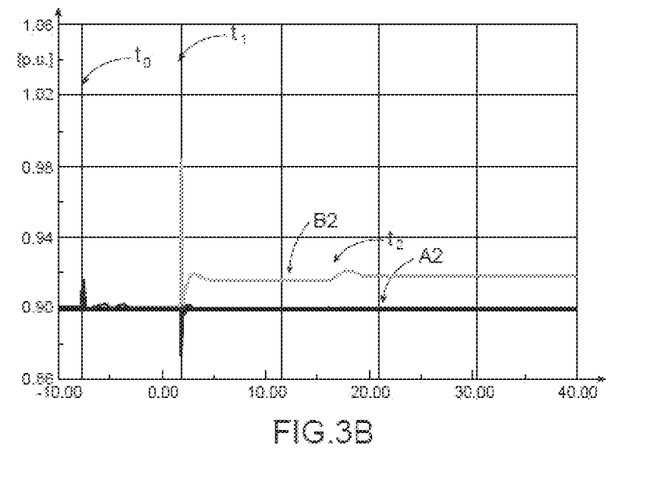
FIG. 3B represents the active power delivered (vertical axis) as a function of time (horizontal axis) by the network-forming generator (curve A2) and by the synchronous generator (curve B2) as part of the first simulation of the present invention.

FIG. 3b represents the active power delivered (vertical axis) as a function of time (horizontal axis) by the network-forming generator (curve A2) and by the synchronous generator (curve B2).

Figure 3C:
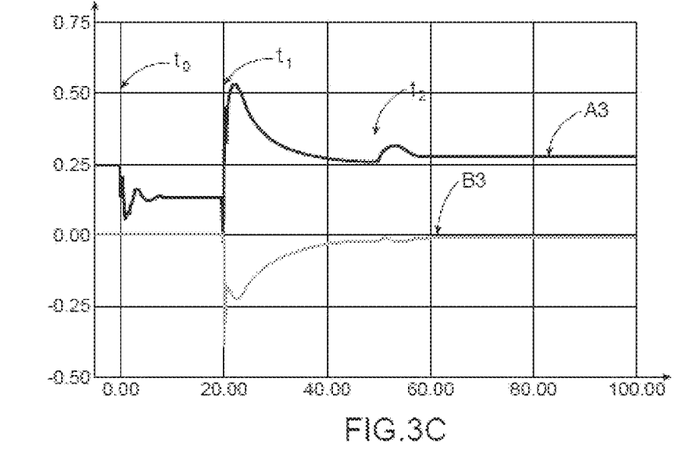
FIG. 3C represents the reactive power delivered (vertical axis) as a function of time (horizontal axis) by the network-forming generator (curve A3) and by the synchronous generator (curve B3) as part of the first simulation of the present invention.

FIG. 3c represents the reactive power delivered (vertical axis) as a function of time (horizontal axis) by the network-forming generator (curve A3) and by the synchronous generator (curve B3).

Figure 3D:
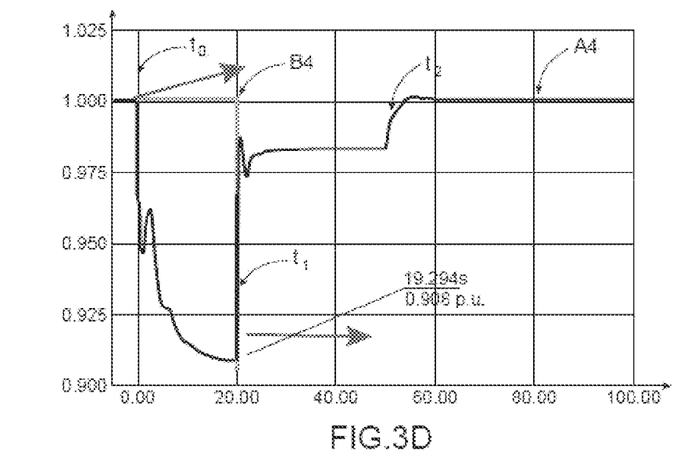
FIG. 3D represents the frequency f delivered (vertical axis) as a function of time (horizontal axis) by the network-forming generator (curve A4) and by the synchronous generator (curve B4) as part of the first simulation of the present invention.

FIG. 3d represents the frequency f delivered (vertical axis) as a function of time (horizontal axis) by the network-forming generator (curve A4) and by the synchronous generator (curve B4).

At $t=t_0$, the voltage (curve A1, FIG. 3a) and the reactive power (curve A3, FIG. 3c) that are delivered by the network-forming generator drop by approximately 10%. From this time, the synchronous generator is started and synchronized with the network at the time $t_1=t_0+20$ s (curves B1, B2, B3, B4).

At the time $t_1$, the synchronous generator adjusts the frequency f of the electric power that it delivers on the network such as to keep the ratio V/f at a predetermined value corresponding to the ratio of the setpoint voltage and of the setpoint frequency of the network. This adjustment takes place during the primary regulation phase which extends between the time $t_1$ and a time $t_2=t_0+50$ s.

According to a second example, the inventors simulated the behaviour of a network-forming inverter.

Figure 4A:
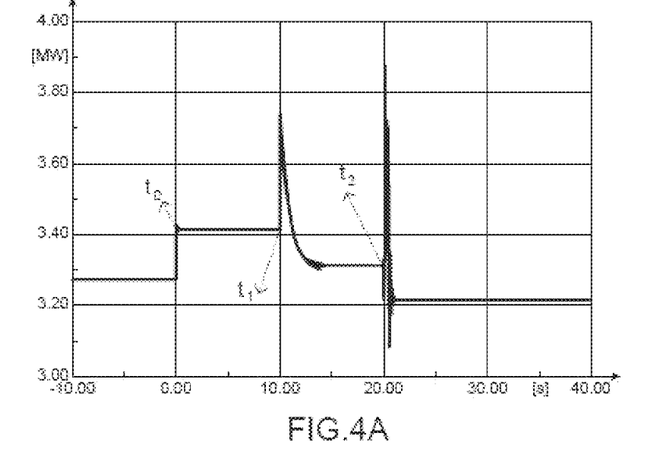
FIG. 4A represents the active power (vertical axis) delivered by an inverter as a function of time (horizontal axis) as part of a second simulation of the present invention.

FIG. 4a represents the active power delivered by the inverter (vertical axis) as a function of time (horizontal axis).

Figure 4B:
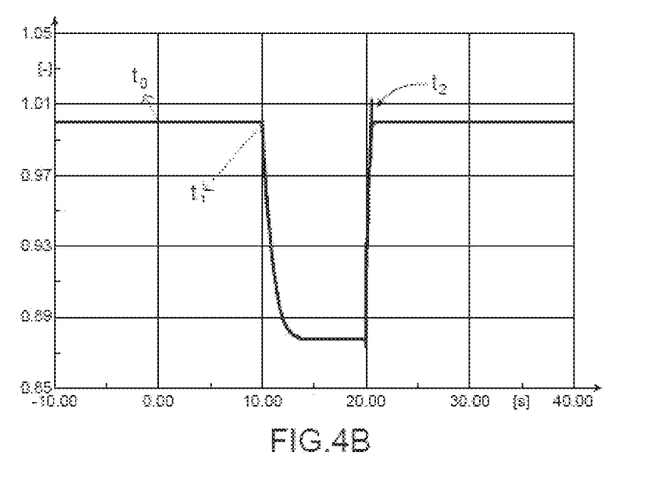
FIG. 4B represents the power frequency (vertical axis) delivered by an inverter as a function of time (horizontal axis) as part of the second simulation of the present invention.

FIG. 4b represents the power frequency delivered by the inverter (vertical axis) as a function of time (horizontal axis).

Figure 4C:
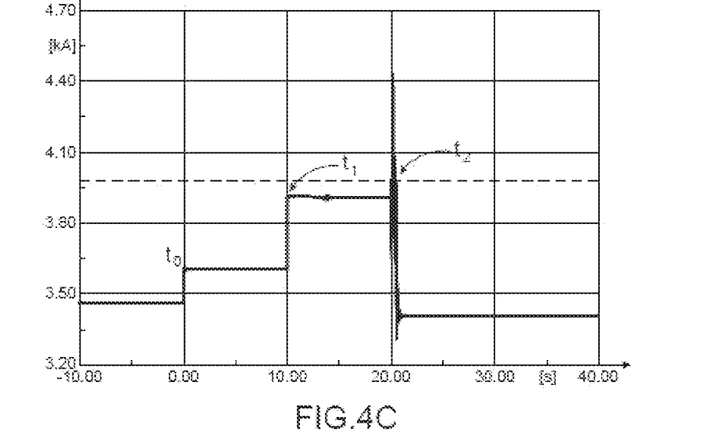
FIG. 4C represents the current (vertical axis) delivered by an inverter as a function of time (horizontal axis) as part of the second simulation of the present invention.

FIG. 4c represents the current delivered by the inverter (vertical axis) as a function of time (horizontal axis).

Figure 4D:
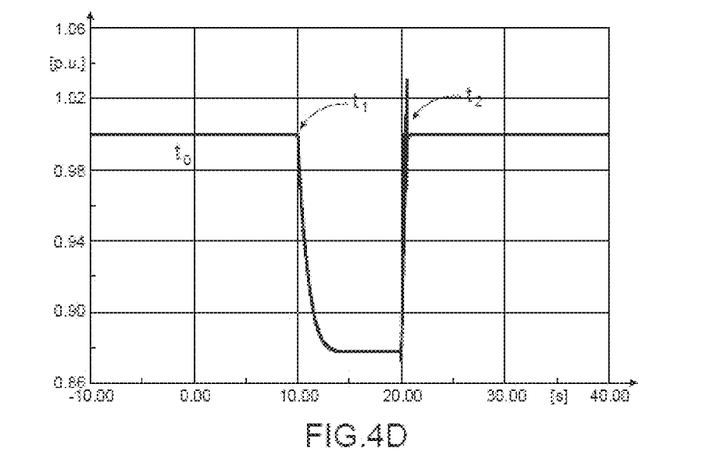
FIG. 4D represents the voltage (vertical axis) delivered by two inverters as a function of time (horizontal axis) as part of the second simulation of the present invention.

FIG. 4d represents the voltage delivered by the inverter (vertical axis) as a function of time (horizontal axis).

At the time to, a 150 kW load demand occurs. The inverter then has a sufficient primary reserve to respond thereto using droop.

At a time $t_1=t_0+10$ s, a fault appears on the network. The latter takes the form of a 660 kW load demand (FIG. 4a). Since the primary reserve is insufficient in this case, the inverter adjusts both the frequency f (FIG. 4b) and the voltage V (FIG. 4d) of the power that it delivers during the primary regulation phase which extends between the time $t_1$ and the time $t_2=t_0+20$ s. During this phase, the adjustment is executed such as to keep the ratio V/f constant according to the terms of the present invention, and thus stabilize the network.

The secondary regulation phase starts from the time $t_2$ such as to reset the network into a state required by the operator.

According to a third example, the inventors simulated the behaviour of two inverters that can form the network.

Figure 5A:
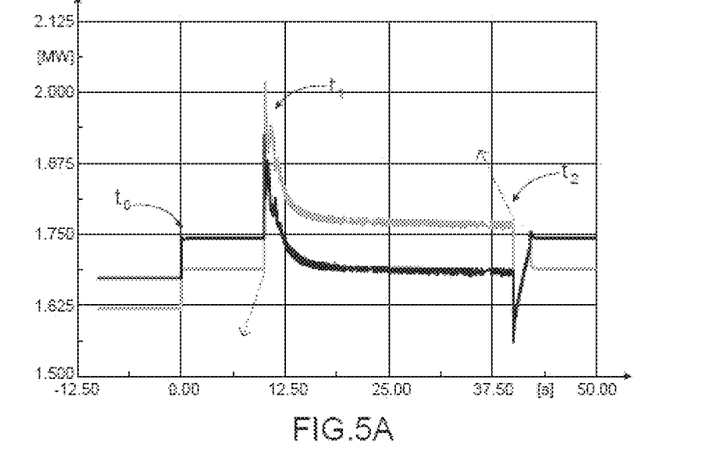
FIG. 5A represents the active power (vertical axis) delivered by two inverters as a function of time (horizontal axis) as part of a third simulation of the present invention.

FIG. 5a represents the active power (vertical axis) delivered by each of the inverters as a function of time (horizontal axis).

Figure 5B:
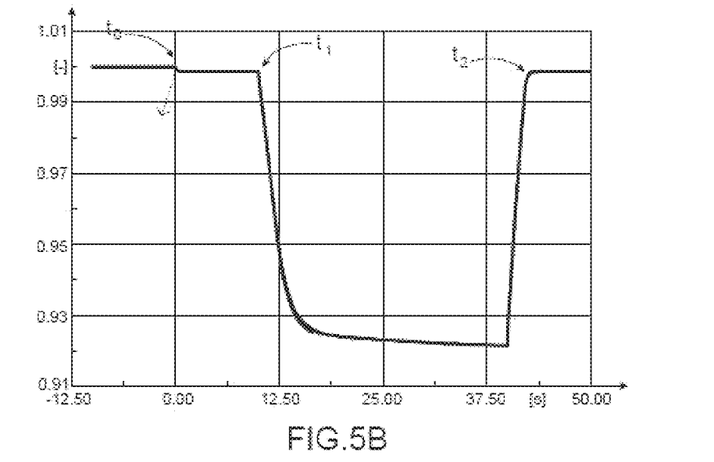
FIG. 5B represents the power frequency (vertical axis) delivered by two inverters as a function of time (horizontal axis) as part of the third simulation of the present invention.

FIG. 5b represents the power frequency (vertical axis) delivered by each of the inverters as a function of time (horizontal axis).

Figure 5C:
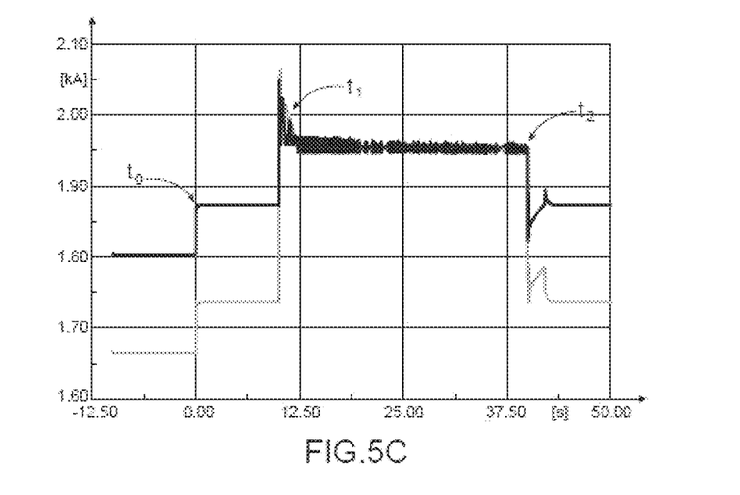
FIG. 5C represents the currents (vertical axis) delivered by two inverters as a function of time (horizontal axis) as part of the third simulation of the present invention.

FIG. 5c represents the current (vertical axis) delivered by each of the inverters as a function of time (horizontal axis).

Figure 5D:
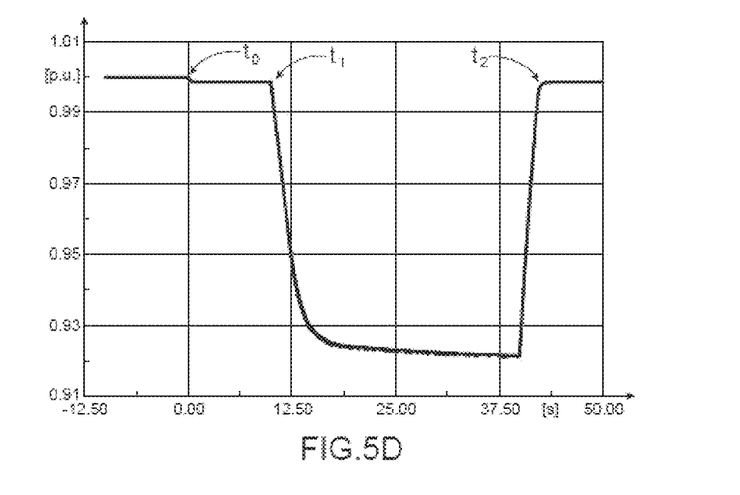
FIG. 5D represents the voltages (vertical axis) delivered by two inverters as a function of time (horizontal axis) as part of the third simulation of the present invention.

FIG. 5d represents the voltage (vertical axis) delivered by each of the inverters as a function of time (horizontal axis).

At the time $t_0$, a 150 kW load demand occurs. The inverters then each adjust the frequency thereof (FIG. 5b) and the voltage thereof (FIG. 5d) such as to keep the ratio V/f substantially constant. This first regulation extends between the time to and a time $t_1=t_0+10$ s from which the network is subject to a second 495 kW load demand (FIG. 5a).

At this time $t_1=t_0+10$ s, the two inverters again regulate the frequency (FIG. 5b) and the voltage (FIG. 5d) such as to keep the ratio V/f constant according to the terms of the present invention, and thus stabilize the network.

The secondary regulation phase starts from the time $t_2$ such as to reset the network into a state required by the operator.

These simulations demonstrate that the regulation according to the terms of the invention can be implemented on networks powered by one or more energy sources, and notably one or more inverters that can form the network.

The universal nature of the proposed method makes the application thereof possible in a large number of pre-existing distribution networks.

The invention claimed is:

1. A regulation process of an electrical distribution network that comprises a main power source, among one or more electrical sources, configured to impose on the network a voltage and a frequency of a power circulating on the network to which one or more loads are connected, the process comprising: in the event of a variation of one of the frequency or the voltage detected on the network, during a primary regulation, adjusting independently by the main power source the other one of the frequency or the voltage on the network, to maintain substantially constant a ratio of the voltage to the frequency of the power circulating on the network, wherein the main power source comprises a regulator for executing the adjusting, and wherein the regulator comprises: a voltage regulating module for regulating the voltage of the power circulating through the network; a frequency module for regulating the frequency of the power circulating through the network; and a control module for measuring the frequency and the voltage of the power circulating through the network, and controlling independently the voltage regulating module and the frequency module according to the measurement to maintain substantially constant a ratio of the voltage to the frequency of the power circulating on the network.

2. The process according to claim 1, wherein the regulator measures the frequency and the voltage of the network, the measuring being carried out at regular time intervals.

3. The process according to claim 1, wherein the main power source is intermittent.

4. The process according to claim 3, wherein the main power source is a renewable energy source, and the renewable energy source comprises at least one of a solar energy source, a wind energy source, or another renewable energy source.

5. The process according to claim 3, wherein the main power source comprises an inverter supplied with a control law giving the inverter a synchronous generator behaviour such that the main power source forms a virtual synchronous generator.

6. The process according to claim 1, wherein the electrical distribution network also comprises at least one of intermittent sources, or renewable energy sources.

7. The process according to claim 1, wherein the primary regulation is followed by a secondary regulation allowing the frequency and the voltage of the network to be restored to predetermined values.

8. The process according to claim 1, wherein one of the electrical sources of the network has a primary energy reserve, the process comprising, prior to the adjusting, assessing the primary reserve with regard to a load demand or a fault that can occur on the network.

9. The process according claim 8, wherein, once the primary reserve is assessed as being sufficient to respond to a load demand or to a fault, the assessing also comprises implementing a regulation based on injecting at least some of the primary reserve onto the network so as to respond to the load demand or to the fault.

10. A computer program product comprising a non-transitory computer readable medium having computer executable instructions stored thereon which, when executed by a computer, causes implementing the process according to claim 1.

11. A power source configured to impose on the network the voltage and the frequency of a power circulating on said network, and provided with the computer program product according to claim 10.

12. The process according to claim 1, wherein the adjusting operation is implemented in response to a fault on the network in order to compensate for the fault.

13. The process according to claim 1, wherein the one or more electrical sources comprises a plurality of electrical sources, and the ratio of the voltage to the frequency of the power circulating on the network is maintained substantially constant by the main power source without requiring communication among the main power source and the other electrical source(s).

14. A system for regulating power on an electrical distribution network, comprising: a main power source, among one or more electrical sources on the network, the main power source being configured to impose on the network a voltage and a frequency of a power circulating on the network to which one or more loads are connected, wherein, in the event of a variation of one of the frequency or the voltage detected on the network, during a primary regulation, the main power source adjusts independently the other one of the frequency or the voltage on the network, to maintain substantially constant a ratio of the voltage to the frequency of the power circulating on the network, wherein the main power source comprises a regulator for executing the adjusting operation, and wherein the regulator comprises: a voltage regulating module for regulating the voltage of the power circulating through the network; a frequency module for regulating the frequency of the power circulating through the network; and a control module for measuring the frequency and the voltage of the power circulating through the network, and controlling independently the voltage regulating module and the frequency module according to the measurement to maintain substantially constant a ratio of the voltage to the frequency of the power circulating on the network.

15. The system according to claim 14, wherein the adjusting operation is implemented in response to a fault on the network in order to compensate for the fault.

16. The system according to claim 14, wherein the one or more electrical sources comprises a plurality of electrical sources, and the main power source maintains substantially constant the ratio of the voltage to the frequency of the power circulating on the network without requiring communication among the main power source and the other electrical source(s).

* * * * *